May 26, 1970     L. V. POWELL     3,514,029
BREAD AND WINE COMPARTMENTED COMMUNION CONTAINER
Filed July 8, 1968
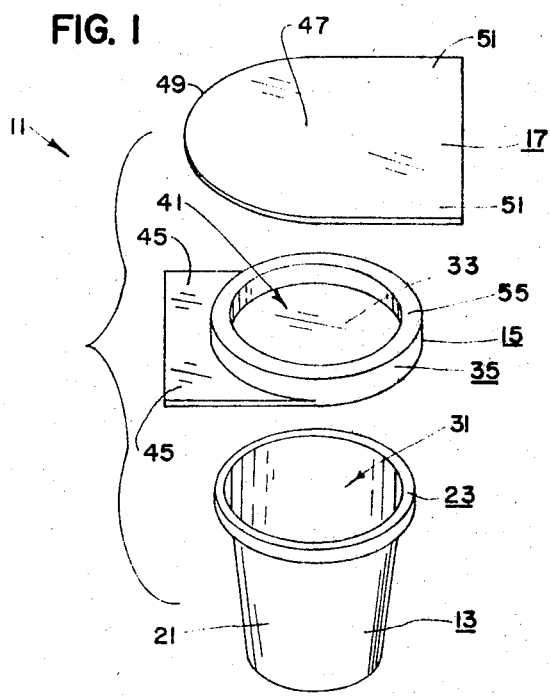
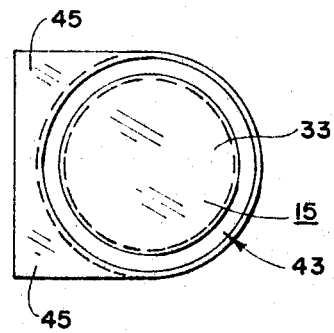
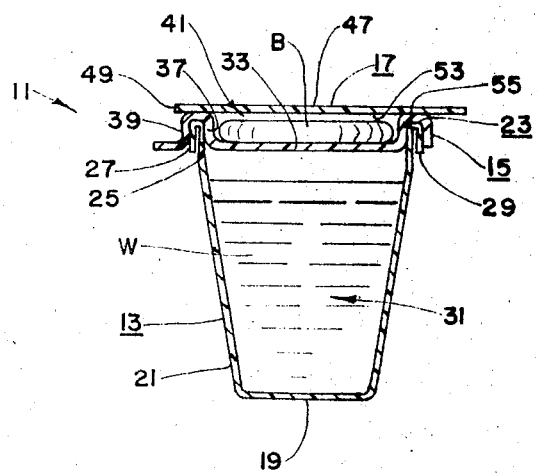
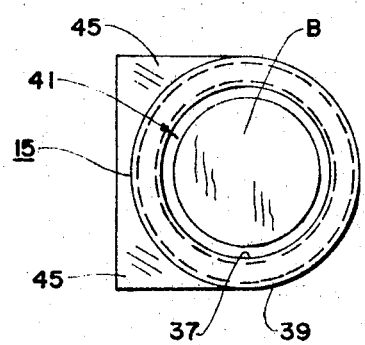
INVENTOR.
LEE V. POWELL
BY John R. Walker, III
Attorney

United States Patent Office 3,514,029
Patented May 26, 1970

3,514,029
BREAD AND WINE COMPARTMENTED
COMMUNION CONTAINER
Lee V. Powell, 700 Marianna St.,
Memphis, Tenn. 38114
Filed July 8, 1968, Ser. No. 743,144
Int. Cl. B65d *1/36, 85/00, 1/24*
U.S. Cl. 229—15          4 Claims

ABSTRACT OF THE DISCLOSURE

The compartmented communion container of the invention is in three separable parts including a cup-like lower element adapted to contain the wine, an intermediate element adapted to be removably secured over the cup-like lower element and having a recessed center portion adapted to contain the bread wafer or symbolic bread, and including a flat top element or cover sealingly secured on the intermediate element and arranged over the bread-containing-recess of the intermediate element.

BACKGROUND OF THE INVENTION

Field of the invention

The present invention relates to cup-like compartmented containers generally and particularly relates to such containers adapted for use in partaking of symbolic bread and wine in a religious communion service.

Description of the prior art

Although various procedures are carried out in dispensing the bread and wine in a communion service, the typical practice is to have separate containers for the bread and the wine. A typical practice in dispensing the sacramental elements to the communicants is to convey the bread and wine in a hand-carried tray. Such a tray typically includes a plate of wafers or bread and includes a multi-apertured holder holding a multiplicity of small thimble-like glasses containing the wine. A communicant as he partakes of the sacrament first partakes of the bread, and then the wine from one of the small thimble-like glasses.

Certain difficulties have been noted in the manner of dispensing the bread and wine elements to the communicants of a congregation: (1) If the membership of the congregation is large, and if a large number of communicants are to be served at the communion service, the service may not be expeditiously performed; as often occurs, the communion sacrament is a rather long service. (2) The handling of the bread and wine elements requires considerable dexterity and not infrequently a communicant may inadvertently drop or mishandle the bread or the small glass wine containers. Not infrequently, the communicant may drop and break a wine glass container. (3) The wineglasses, after the communion service, must be washed and prepared for a succeeding service. In washing and preparing the wineglasses there is the likelihood of breaking the glasses. (4) Also, many small congregations have not the proper facilities for adequately cleaning the wineglasses and this presents a sanitation problem. Perhaps the glasses and other communion serving utensils are cleaned or washed in cold water and are not properly cleaned.

SUMMARY OF THE INVENTION

The present invention contemplates forming a compartmented communion container formed of thin plastic material and such a container adapted to be disposed of after use. The compartmented communion container of the invention includes dual compartments for holding respectively the wine and bread elements. A communicant is served a single container which he may manipulate to first partake of the bread and then partake of the wine; the communicant removes first a cover covering the bread and then removes the cover covering the wine. The container parts are disposed of after use thereby obviating the necessity of cleaning, preparing and storing the communion items for a succeeding service. Such a disposable communion container is sanitary and reduces the likelihood of unwanted bacteria being on the communion items. A larger number of communicants may be served and the communion service may be expeditiously carried out.

The communion containers of the invention preferably are of a diameter or size comparable to the size of a conventional communion wineglass and of such size as to be readily received in the glass-receiving openings of a conventional communion serving tray.

BRIEF DESCRIPTION OF THE DRAWING

FIG. 1 is a perspective view of the communion container with the three parts of the container arranged in vertically spaced configuration for purposes of clarity.

FIG. 2 is a view of the intermediate member of the container as shown in FIG. 1 and as viewed upwardly.

FIG. 3 is a view, viewed downwardly, of the intermediate element of FIG. 1 and showing also a wafer of bread contained in the intermediate element.

FIG. 4 is a vertical plane cross-sectional view of the communion container with the container being in an assembled configuration.

DESCRIPTION OF THE PREFERRED EMBODIMENT

The communion container is indicated by numeral 11 and includes three elements including a cup-like lower element 13; an intermediate element 15 adapted for frictional securement on the rim portion of lower element 13; and an upper element 17 removably bonded to intermediate member 15. Each of lower, intermediate, and upper elements 13, 15, 17 are preferably formed of vinyl or other thermo-plastic material and each are of uniform wall thickness.

Lower element 13 preferably is integrally formed and includes a horizontal bottom wall 19 and an upstanding circumferential lateral wall 21 terminating in an upwardly oriented circular rim 23. Lower element rim 23 preferably is generally inverted U-shaped in transverse radial section and is formed substantially by an inner rim portion 25, and an outer rim portion 27 concentrically arranged relative to inner rim 25. Lower element rim 23 extends generally upwardly and then outwardly and downwardly terminating in a downwardly oriented bottom edge 29. Lower element 13 is adapted to contain a quantity of wine W or other sacramental liquid in chamber 31.

Intermediate element 15 is generally flattened in configuration and is adapted for frictional securement on rim 23 of lower element 13. Intermediate element 15 basically includes a flat center portion 33 and a rim portion 35 defined substantially by inner and outer circumferential concentrically arranged flanges 37, 39. Intermediate element center portion 33 and inner flange 37 define a rather shallow recess or chamber 41 adapted to receive a wafer of bread B or other sacramental element. Intermediate element rim portion 35 is generally inverted U-shaped in lateral transverse section and defines a downwardly opening circumferentially extending slotway 43. The relative configurations respectively of lower element rim 23 and intermediate element rim 35 is such that intermediate element 15 is adapted for frictional securement on lower element 13 with rim 23 of element 13 being frictionaly received in the structure of slotway 43. Intermediate element 15 preferably includes tab structure including a pair of tab portions 45, 45 projecting horizontally perpendicularly from intermediate element rim 35.

Upper element 17 is thin and plate-like in configuration and includes a generally circular main portion 47 defined in part by a semi-circular edge 49, and a pair of tab portions 51, 51. Upper element 17 is detachably secured on intermediate element 15 with undersurface 53 of upper element 17 being integrally bonded as by heat sealing with the circumferential upper surface of horizontally planar portion 55 of intermediate element rim portion 35. The relative arrangement respectively of upper element 17 and intermediate element 15 preferably is such that tab portions 51, 51 of the upper element extend oppositely from tab portions 45, 45 of the intermediate element. The oppositely extending tab portions 45, 45; 51, 51 respectively of intermediate and upper elements 15, 17 permit a user of the container to first remove upper element 17 from intermediate element 15 and then remove the intermediate element from lower element 13. The oppositely extending tab portions permit a user of the container to first partake of the bread in chamber 41 and then partake of the wine in chamber 31.

To remove the bread from chamber 41, a communicant has only to pull upwardly on tab portion 51, 51 while firmly holding lower element 13; pulling upwardly on tab portions 51, 51 severs the frangible bond between upper and intermediate elements 17, 15, displaces upper element 17 from intermediate element 15, and exposes the bread in chamber 41 for use. Pulling upwardly on tab portions 45, 45 of intermediate element 15 frictionally disengages rim portions 23, 35 of lower and upper elements 13, 15 thereby displacing intermediate element 15 and exposing the wine in chamber 31.

Lateral wall 21 of lower element 13 preferably is configured generally frusto-conical and of a size and shape corresponding substantially with a conventional communion service wineglass. Lower element 13 of container 11 is preferably of a size and configuration to be received in existing or conventional wineglass holders used in communion services.

While I have shown and described a preferred embodiment of the present invention, it will be understood that various modifications and changes in structure may be made without departing from the scope of the invention as defined in the appended claims.

I claim:
1. A small compartmented communion container adapted for use in containing and dispensing bread and wine during a sacramental communion service comprising a lower element, an upper element, and an intermediate element; each element being of substantially thin wall construction, said lower element being cuplike in form having a bottom wall and an upstanding circumferential side wall terminating in an upwardly facing horizontally planar circular rim with a downwardly turned peripheral flange, said lower element forming a wine chamber adapted to contain a quantity of sacramental wine or the like, said intermediate element including a generally flat horizontal main portion bounded by an axially upwardly convex rim; said rim including an annular planar portion, a circumferential inner flange converging inwardly and downwardly from the inner boundary of said planar portion and a circumferential continuously extending outer flange concentrically arranged relative to said inner flange and extending downwardly from the outer boundary of said planar portion; said inner and outer flanges and said planar portion defining substantially a downwardly opening continuous peripheral groove receiving the terminal edge of the side wall of the lower element, said planar portion defining the uppermost portion of said rim with the remainder of said rim being below said planar portion, said intermediate element main portion and inner flange defining an upwardly opening bread chamber adapted to contain a sacramental bread wafer or the like, said upper element being substantially thin and flat, having frangible bond means removably bonding said upper element flatwise on said planar portion of said intermediate element and sealingly covering said bread chamber.

2. The compartmented communion container of claim 1 wherein said intermediate element rim is of a size to detachably snugly fit over said lower element rim with said inner and outer flanges respectively of said intermediate elements being in disengageable frictional engaged relation with the inner and outer rim portions of said lower element.

3. The compartmented communion container of claim 2 wherein said intermediate element includes tab structure extending cantilever fashion horizontally outwardly from the circular rim thereof at least along a circumferential portion of said rim edge and adapted to provide finger grip means for removably disengaging said intermediate element from said lower element.

4. The compartmented communion container of claim 3 wherein said upper element includes cantilever configured tab structure extending horizontally outwardly from at least a circumferential portion of said upper element; said upper element tab structure providing finger grip means for removably disengaging said upper element from said intermediate element.

References Cited
UNITED STATES PATENTS

| | | | |
|---|---|---|---|
| 1,514,379 | 11/1924 | Fleischer | 206—47 |
| 1,616,665 | 2/1927 | Murch. | |
| 2,034,067 | 3/1936 | Stone | 206—47 |
| 2,276,678 | 3/1942 | Wheeler | 220—23 X |
| 2,766,796 | 10/1956 | Tupper | 150—.5 |
| 3,202,271 | 8/1965 | Kirk | 206—56 |
| 3,349,941 | 10/1967 | Wanderer | 229—15 X |
| 3,351,225 | 11/1967 | Speas et al. | 206—47 X |
| 3,367,484 | 2/1968 | Nelson | 220—23 X |

JOSEPH R. LECLAIR, Primary Examiner

J. R. GARRETT, Assistant Examiner

U.S. Cl. X.R.

150—.5; 206—19, 47; 215—6; 220—23